DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 4, 1973

917 O.G. 8

T917,002

SEWING THREAD HAVING A SILICONE LUBRICANT AND FLAME RETARDANT ON THE SURFACE OF THREAD

Robert R. Sanders, 3289 Ashley St., Kingsport, Tenn. 37664

Filed June 15, 1972, Ser. No. 263,065
**Int. Cl. C09d *1/00***
U.S. Cl. 117—136
No Drawing. 7 Pages Specification

Disclosed is a sewing thread comprised of a synthetic thermoplastic polymer, the sewing thread having on its surface a silicone lubricant and an organic bromine-containing flame retardant. More specifically, the sewing thread has on its surface, based on the weight of the sewing thread, from about 0.3 to about 6 weight percent silicone and, based on the weight of the sewing thread, a sufficient quantity of an organic bromine-containing flame retarder to result in about 0.1 to about 2 weight percent bromine on the surface of the sewing thread. Examples of the many kinds of synthetic thermoplastic polymers that are within the scope of this invention include cellulose acetate, polyamide, polyester, cellulose triacetate, acrylic and modacrylic. In a preferred embodiment the synthetic thermoplastic polymer is polyester and in one especially preferred embodiment the polyester is poly(ethylene terephthalate). The silicone lubricant used in this invention is the type normally employed to lubricate sewing thread and chemically is poly(dimethyl siloxane) having a molecular weight making it suitable as a sewing thread lubricant. The flame retarder used in this invention can be described as a bromine-containing flame retarder which contains, based on the weight of the organic bromine-containing flame retarder, from about 40 to about 85% of bromine by weight and preferably contains from about 60 to about 80% bromine. Flame retarders that contain both phosphorus and bromine are particularly desirable in this invention. Suitable flame retarders are represented by bis(bromochloropropyl) bromochloropropyl phosphonate, tris(2,3 - dibromopropyl) phosphate, tris(dibromophenyl) phosphate and di(2,3-dibromopropyl) tribromophenyl phosphate. The sewing thread of this invention advantageously exhibits desirable sewability due to the silicone lubricant and also imparts desirable flame retardancy to the sewn garment due to the organic bromine-containing flame retarder.